US012574806B2

(12) United States Patent　　　(10) Patent No.:　US 12,574,806 B2
Xu et al.　　　　　　　　　　　　(45) Date of Patent:　　Mar. 10, 2026

(54) DEVICE, METHOD, APPARATUS AND COMPUTER READABLE MEDIUM FOR IAB COMMUNICATION

(71) Applicant: Nokia Solutions and Networks Oy, Espoo (FI)

(72) Inventors: Xiang Xu, Nanjing (CN); Ilkka Keskitalo, Oulu (FI); Henri Koskinen, Espoo (FI); Matti Laitila, Oulu (FI); Ömer Bulakci, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 565 days.

(21) Appl. No.: 18/005,786

(22) PCT Filed: Aug. 5, 2020

(86) PCT No.: PCT/CN2020/107232
§ 371 (c)(1),
(2) Date: Jan. 17, 2023

(87) PCT Pub. No.: WO2022/027380
PCT Pub. Date: Feb. 10, 2022

(65) Prior Publication Data
US 2023/0300685 A1　　Sep. 21, 2023

(51) Int. Cl.
*H04W 36/00*　　　(2009.01)
*H04W 36/08*　　　(2009.01)

(52) U.S. Cl.
CPC ....... *H04W 36/0033* (2013.01); *H04W 36/08* (2013.01)

(58) Field of Classification Search
CPC ........... H04W 36/087; H04W 36/0064; H04W 40/36; H04W 36/0055; H04W 36/08; H04W 36/0033
See application file for complete search history.

(56) References Cited

U.S. PATENT DOCUMENTS 10,321,368 B1　6/2019　Sivakumar et al.
12,041,494 B2 *　7/2024　Koskinen .............. H04W 76/30
(Continued)

FOREIGN PATENT DOCUMENTS

CN　　109391963 A　　2/2019
CN　　110636561 A　　12/2019
(Continued)

OTHER PUBLICATIONS

"3rd Generation Partnership Project; Technical Specification Group Radio Access Network; NG-RAN; Architecture description (Release 16)", 3GPP TS 38.401, V16.1.0, Mar. 2020, pp. 1-50.
(Continued)

*Primary Examiner* — Allahyar Kasraian
(74) *Attorney, Agent, or Firm* — Barta Jones, PLLC

(57)　　　　　　ABSTRACT

Embodiments of the present disclosure relate to devices, methods, apparatuses and computer readable media for communication during inter-donor topology adaptation. A first device transmits, to a second device, first information about a first communication interface between the first device and a third device, receives, from the second device, an indication that context information associated with at least one fourth device and the first communication interface is retained, and uses the context information in communication via a second communication interface between the first device and the second device. The second device receive the first information, transmit, to the third device, a request for obtaining the context information, and receive the context information from the third device. In this way, reestablishment procedure can be simplified, and signaling over Xn interface, F1 interface and wireless backhaul can be minimized Further, latencies and service break for the terminal devices at the change of the IAB-donor can be reduced.

3 Claims, 7 Drawing Sheets

(56) References Cited

U.S. PATENT DOCUMENTS

| | | | | |
|---|---|---|---|---|
| 2020/0146083 | A1 | 5/2020 | Wang et al. | |
| 2022/0015010 | A1* | 1/2022 | Akl | H04W 40/36 |
| 2022/0369190 | A1* | 11/2022 | Diao | H04W 76/20 |
| 2023/0098848 | A1* | 3/2023 | Ishii | H04W 36/0033 |
| | | | | 370/216 |
| 2023/0180090 | A1* | 6/2023 | Zhu | H04W 76/19 |
| | | | | 370/331 |

FOREIGN PATENT DOCUMENTS

| | | | |
|---|---|---|---|
| WO | 2020/067736 A1 | 4/2020 | |
| WO | 2024/011574 A1 | 1/2024 | |

OTHER PUBLICATIONS

"3rd Generation Partnership Project; Technical Specification Group Radio Access Network; NG-RAN; F1 application protocol (F1AP) (Release 16)", 3GPP TS 38.473, V16.1.0, Mar. 2020, pp. 1-240.

"3rd Generation Partnership Project; Technical Specification Group Radio Access Network; NR; Study on Integrated Access and Backhaul; (Release 16)", 3GPP TR 38.874, V16.0.0, Dec. 2018, pp. 1-111.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.

"IEEE 802.11", Wikipedia, Retrieved on Feb. 12, 2023, Webpage available at : https://en.wikipedia.org/wiki/IEEE_802.11.

International Search Report and Written Opinion received for corresponding Patent Cooperation Treaty Application No. PCT/CN2020/107232, dated Apr. 27, 2021, 9 pages.

"Inter-donor topology adaptation for architecture 1a", 3GPP TSG-RAN WG3 #102, R3-186751, Agenda item: 24.2, LG Electronics Inc., Nov. 12-16, 2018, 7 pages.

"Rel-17 IAB email discussion—report", 3GPP TSG RAN meeting #86, RP-192520, Agenda item: 9.1.2, Qualcomm Incorporated, Dec. 9-12, 2019, 39 pages.

"Inter-Donor CU Topology Adaptation", 3GPP TSG-RAN WG3 Meeting #103, R3-190496, Agenda Item: 13.3.2.3, Huawei, Feb. 25-Mar. 1, 2018, pp. 1-2.

Office Action received for corresponding Chinese Patent Application No. 202080104344.0, dated May 17, 2024, 7 pages of Office Action and no page of translation available.

\* cited by examiner

100

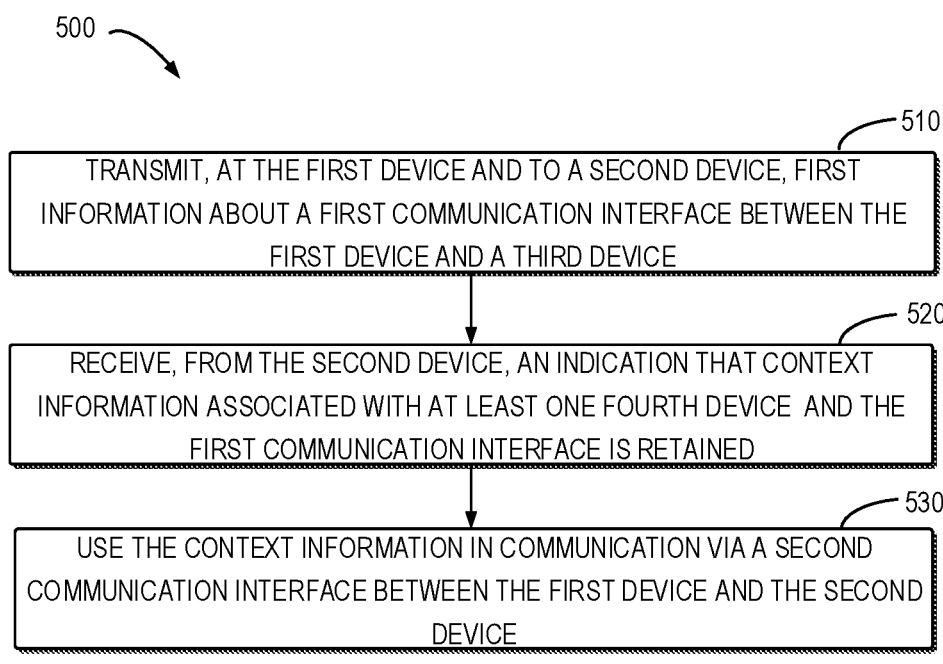

500

510
TRANSMIT, AT THE FIRST DEVICE AND TO A SECOND DEVICE, FIRST INFORMATION ABOUT A FIRST COMMUNICATION INTERFACE BETWEEN THE FIRST DEVICE AND A THIRD DEVICE

520
RECEIVE, FROM THE SECOND DEVICE, AN INDICATION THAT CONTEXT INFORMATION ASSOCIATED WITH AT LEAST ONE FOURTH DEVICE AND THE FIRST COMMUNICATION INTERFACE IS RETAINED

530
USE THE CONTEXT INFORMATION IN COMMUNICATION VIA A SECOND COMMUNICATION INTERFACE BETWEEN THE FIRST DEVICE AND THE SECOND DEVICE

Fig. 5

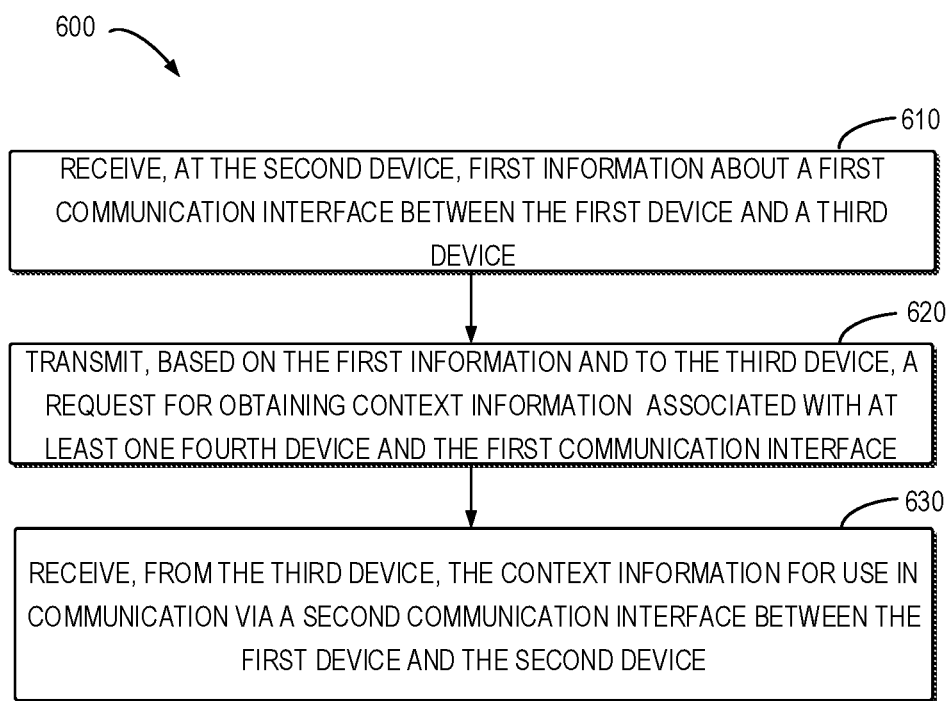

600

610
RECEIVE, AT THE SECOND DEVICE, FIRST INFORMATION ABOUT A FIRST COMMUNICATION INTERFACE BETWEEN THE FIRST DEVICE AND A THIRD DEVICE

620
TRANSMIT, BASED ON THE FIRST INFORMATION AND TO THE THIRD DEVICE, A REQUEST FOR OBTAINING CONTEXT INFORMATION ASSOCIATED WITH AT LEAST ONE FOURTH DEVICE AND THE FIRST COMMUNICATION INTERFACE

630
RECEIVE, FROM THE THIRD DEVICE, THE CONTEXT INFORMATION FOR USE IN COMMUNICATION VIA A SECOND COMMUNICATION INTERFACE BETWEEN THE FIRST DEVICE AND THE SECOND DEVICE

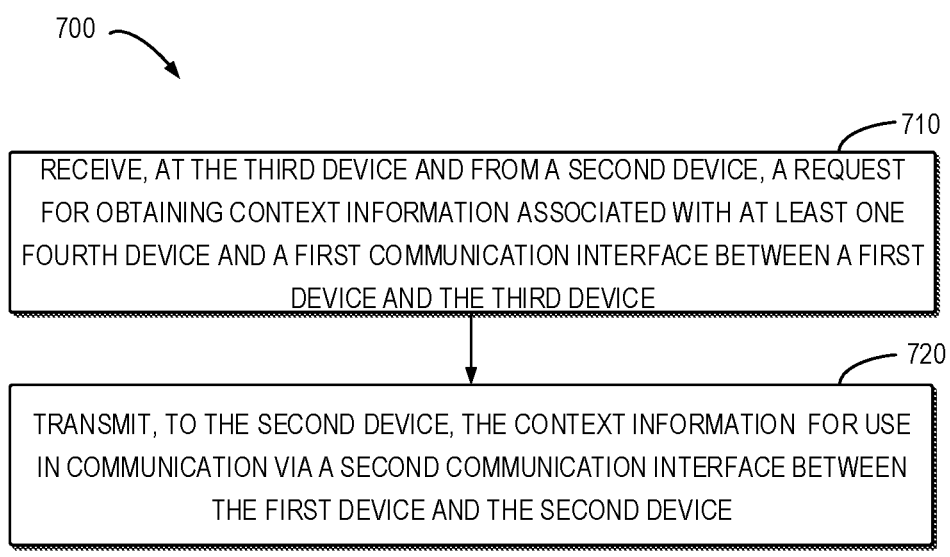

710

RECEIVE, AT THE THIRD DEVICE AND FROM A SECOND DEVICE, A REQUEST FOR OBTAINING CONTEXT INFORMATION ASSOCIATED WITH AT LEAST ONE FOURTH DEVICE AND A FIRST COMMUNICATION INTERFACE BETWEEN A FIRST DEVICE AND THE THIRD DEVICE

720

TRANSMIT, TO THE SECOND DEVICE, THE CONTEXT INFORMATION FOR USE IN COMMUNICATION VIA A SECOND COMMUNICATION INTERFACE BETWEEN THE FIRST DEVICE AND THE SECOND DEVICE

Fig. 7

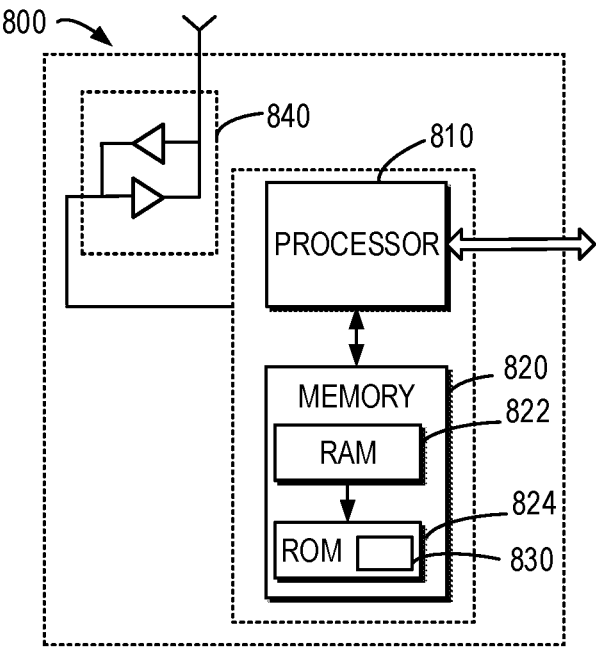

Fig. 8

DEVICE, METHOD, APPARATUS AND COMPUTER READABLE MEDIUM FOR IAB COMMUNICATION

RELATED APPLICATION

This application was originally filed as PCT Application No. PCT/CN2020/107232, filed on Aug. 5, 2020, which is incorporated herein by reference in its entirety.

FIELD

Embodiments of the present disclosure generally relate to the field of telecommunication and in particular, to devices, methods, apparatuses and computer readable media for communication during inter-donor topology adaptation and/or inter-donor mobility.

BACKGROUND

Integrated Access and Backhaul (JAB) enables wireless relaying for New Radio (NR) access by using NR for backhauling. A relaying node is referred to as an IAB-node. The terminating node of NR backhauling on network side is referred to as an IAB-donor. The IAB-donor represents a gNB with additional functionality to support IAB. Back-hauling may occur via a single hop of an IAB-node or multiple hops of IAB-nodes.

In some scenarios, an IAB-node may change its attachment point from a source IAB-donor to a target IAB-donor different from the source IAB-donor. Such topology adaptation may be referred to as inter-donor topology adaptation. A change of the IAB-donor may also be referred to as inter-donor mobility, e.g., in case the IAB-donor is a mobile IAB-node. A mobile IAB-node may be implemented on a vehicle, e.g., a bus. A procedure for inter-donor topology adaptation may involve that F1 Application Protocol (F1AP) context for terminal devices connected to the IAB node is removed during establishment of a F1 interface between the IAB node and target IAB-donor and then reestablished between the IAB node and the target IAB-donor when the terminal devices perform Radio Resource Control (RRC) reestablishment procedure. This may affect all child (or descendant) IAB nodes of the IAB node and all terminal devices connected to the child IAB nodes. Thus, how to manage the FIAP context for the terminal devices needs to be discussed.

SUMMARY

In general, example embodiments of the present disclosure provide a solution of communication during inter-donor topology adaptation.

In a first aspect, there is provided a first device. The first device comprises at least one processor; and at least one memory including computer program codes; the at least one memory and the computer program codes are configured to, with the at least one processor, cause the first device to: transmit, at the first device and to a second device, first information about a first communication interface between the first device and a third device; receive, from the second device, an indication that context information associated with at least one fourth device and the first communication interface is retained; and use the context information in communication via a second communication interface between the first device and the second device.

In a second aspect, there is provided a second device. The second device comprises at least one processor; and at least one memory including computer program codes; the at least one memory and the computer program codes are configured to, with the at least one processor, cause the second device to: receive, at the second device, first information about a first communication interface between the first device and a third device; transmit, based on the first information and to the third device, a request for obtaining context information associated with at least one fourth device and the first communication interface; and receive, from the third device, the context information for use in communication via a second communication interface between the first device and the second device.

In a third aspect, there is provided a third device. The second device comprises at least one processor; and at least one memory including computer program codes; the at least one memory and the computer program codes are configured to, with the at least one processor, cause the third device to: receive, at the third device and from a second device, a request for obtaining context information associated with at least one fourth device and a first communication interface between a first device and the third device; and transmit, to the second device, the context information for use in communication via a second communication interface between the first device and the second device.

In a fourth aspect, there is provided a method implemented at a device. The method comprises: transmitting, at a first device and to a second device, first information about a first communication interface between the first device and a third device; receiving, from the second device, an indication indicating that context information associated with at least one fourth device and the first communication interface is retained; and using the context information in communication via a second communication interface between the first device and the second device.

In a fifth aspect, there is provided a method implemented at a device. The method comprises: receiving, at a second device, first information about a first communication interface between the first device and a third device; transmitting, based on the first information and to the third device, a request for obtaining context information associated with at least one fourth device and the first communication interface; and receiving, from the third device, the context information for use in communication via a second communication interface between the first device and the second device.

In a sixth aspect, there is provided a method implemented at a device. The method comprises: receiving, at a third device and from a second device, a request for obtaining context information associated with at least one fourth device and a first communication interface between a first device and the third device; and transmitting, to the second device, the context information of the at least one fourth device for use in communication via a second communication interface between the first device and the second device.

In a seventh aspect, there is provided an apparatus comprising: means for transmitting, at a first device and to a second device, first information about a first communication interface between the first device and a third device; means for receiving, from the second device, an indication indicating that context information associated with at least one fourth device and the first communication interface is retained; and means for using the context information in communication via a second communication interface between the first device and the second device.

In an eighth aspect, there is provided an apparatus comprising: means for receiving, at a second device, first information about a first communication interface between the first device and a third device; means for transmitting, based on the first information and to the third device, a request for obtaining context information associated with at least one fourth device and the first communication interface; and means for receiving, from the third device, the context information for use in communication via a second communication interface between the first device and the second device.

In a ninth aspect, there is provided an apparatus comprising: means for receiving, at a third device and from a second device, a request for obtaining context information associated with at least one fourth device and a first communication interface between a first device and the third device; and means for transmitting, to the second device, the context information for use in communication via a second communication interface between the first device and the second device.

In a tenth aspect, there is provided a computer readable medium comprising a computer program for causing an apparatus to perform at least the method according to the above fourth aspect.

In an eleventh aspect, there is provided a computer readable medium comprising a computer program for causing an apparatus to perform at least the method according to the above fifth aspect.

In a twelfth aspect, there is provided a computer readable medium comprising a computer program for causing an apparatus to perform at least the method according to the above sixth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 5 shows a flowchart of a method implemented at a first device in accordance with some example embodiments of the present disclosure;

FIG. 6 shows a flowchart of a method implemented at a second device in accordance with some example embodiments of the present disclosure;

FIG. 7 shows a flowchart of a method implemented at a third device in accordance with some example embodiments of the present disclosure;

FIG. 8 illustrates a simplified block diagram of an apparatus that is suitable for implementing some other embodiments of the present disclosure.

Throughout the drawings, the same or similar reference numerals represent the same or similar element.

DETAILED DESCRIPTION

Figure 1:
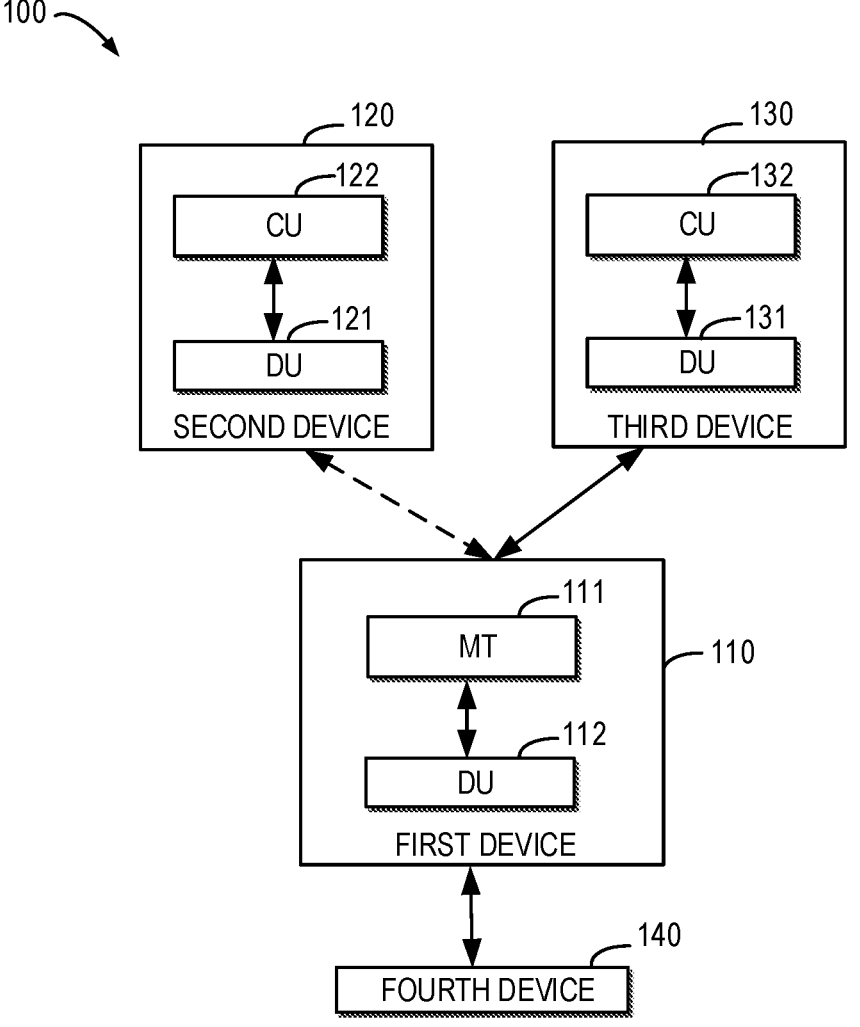
FIG. 1 shows an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. An Radio Access Network (RAN) split architecture comprises a gNB Centralized unit (gNB-CU), hosting Radio Resource Control (RRC), Service Data Adaptation Protocol (SDAP) and Packet Data Convergence Protocol (PDCP) controlling a plurality of gNB Distributed units (gNB-DUs), hosting Radio Link Control (RLC), Medium Access Control (MAC) and Physical layer (PHY).

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

In IAB network architecture, the IAB-node supports gNB-Distributed Unit (DU) functionality to terminate NR access interface to terminal devices and the child IAB-node(s), and to support F1 interface to the gNB-Centralized Unit (CU) on the IAB-donor. The IAB-node also supports the NR Uu radio interface, referred to as mobile termination (MT) functionality, to connect to the DU of another IAB-node or the IAB-donor, and to connect to the gNB-CU on the IAB-donor via RRC.

In some scenarios, such as due to possible failure on the backhaul (BH) connections or changes in IAB topology or the movement of an IAB-node, an IAB-node may need to change its serving node or parent node which may be under the same or different donor. In the latter case, the IAB node may change its attachment point from a source IAB-donor to a target IAB-donor different from the source IAB-donor. Such topology adaptation may be referred to as inter-donor topology adaptation. The IAB-node changing its attachment point is referred to as a migrating IAB-node.

Conventionally, in a procedure for inter-donor topology adaptation, the migrating IAB-node needs to establish a F1 interface with the target IAB-donor. During the setup or establishment of the F1 interface, the context for terminal device(s) (including child IAB-MTs) connected to the migrating IAB-node will be removed. Then the context for terminal devices (including child IAB-MTs) will be reestablished in the migrating IAB-node and the target IAB-donor, e.g., when the terminal device(s) perform RRC connection reestablishment or resume procedure.

In this case, all terminal devices connected to the migrating IAB-node will be affected. The terminal device's service(s) are interrupted when the context is removed, and may be resumed when the context is reestablished. The full context for all terminal devices need to be transmitted over the BH radio link control (RLC) channel(s) between the migrating IAB-node and the target IAB-donor. Further, all child IAB-nodes will also be affected. For example, the BH RLC channels between the migrating IAB-node and the child IAB-nodes need to be released and reestablished. This also affects all terminal devices connected to the child IAB-node(s), since the context for the terminal devices will be removed and reestablished when the DU in the child IAB-node setup F1 interface with target IAB-donor.

Considering the fact that it is the same physical IAB-node (i.e. the migrating IAB-node, and the child IAB-node) serving the terminal devices before the inter-donor topology adaptation and after the inter-donor topology adaptation, i.e., the terminal devices are static relative to the IAB-node serving the terminal device, a more efficient solution is needed to manage the context in the affected IAB-node (i.e. migrating IAB-node and its child IAB-nodes) and target IAB-donor.

In order to at least in part solve above and other potential problems, example embodiments of the present disclosure provide a solution for communication during inter-donor topology adaptation. In the solution, the context information for terminal devices associated with a communication interface between the affected IAB-node (i.e. migrating IAB-node and child IAB-node) and the source IAB-donor is reused for communication via a communication interface between the affected IAB-node (i.e. migrating IAB-node and child IAB-node) and the target IAB-donor. In this way, the terminal device's reestablishment procedure using a communication interface between the affected IAB-node (i.e. migrating IAB-node and child IAB-node) and the target IAB-donor can be simplified, and signaling over Xn interface, F1 interface, and wireless backhaul can be minimized. Further, latencies and service break for the terminal devices at the change of the IAB-donor can be reduced.

FIG. 1 shows an example communication network 100 in which embodiments of the present disclosure can be implemented. The communication network 100 includes a first device 110, a second device 120, a third device 130 and a fourth device 140. In this example, the first device 110 is illustrated as an IAB-node (also referred to as IAB-node device), the second device 120 and the third device 130 are illustrated as IAB-donor (also referred to as IAB-donor device) serving the IAB-node device, and the fourth device 140 is illustrated as a device served by the first device 110. In some embodiments, the fourth device 140 may be a terminal device served by the first device 110. In some embodiments, the fourth device 140 may be an IAB-node device (also referred to as a child IAB-node device) served by the first device 110.

The IAB-donor (for example, the second device 120) consists of an IAB-donor-CU (for example, CU 122) and one or more IAB-donor-DU(s) (for example, DU 121). In case of separation of control plane and user plane, the IAB-donor may consist of an IAB-donor Central Unit Control Plane (IAB-donor-CU-CP), multiple IAB-donor Central Unit User Planes (IAB-donor-CU-UPs) and multiple IAB-donor-DUs. It is to be understood that the number of the first device, second device and the third device, and the fourth device is given for the purpose of illustration without suggesting any limitations to the present disclosure. The communication network 100 may include any suitable number of first, second, third and fourth devices adapted for implementing implementations of the present disclosure.

For example, although only one first device as IAB-node is shown, the communication network 100 may also include one or more upstream IAB-nodes connected between the first device 110 and second device 120 or connected between the first device 110 and third device 130. Of course, the communication network 100 may also include one or more downstream IAB-nodes (i.e., child IAB-nodes). Further, although only one fourth device is shown, the communication network 100 may also include more fourth devices served by the first device 110.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

In this example, the first device 110 comprises an MT 111 and a DU 112. Via the MT 111, the first device 110 connects to the second device 120 or the third device 130. Via the DU 112, the first device 110 establishes RLC-channels to terminal devices and to MTs of downstream IAB-nodes (not shown). The DU 112 has a F1 Control plane interface (F1-C) connection with control plane (CP) of one IAB-donor CU (IAB-donor CU-CP). For example, the DU 112 may have a F1 interface with a CU 122 in the second device 120 or have a F1 interface with a CU 132 in the third device 130.

The second device 120 comprises the DU 121 to support terminal devices and MTs of one or more downstream IAB-nodes. The second device 120 also comprises one CU 122 for the DUs of all IAB-nodes and for its own DUs, for example, DU 121. Similarly, the third device 130 comprises one or more DUs, for example, DU 131, to support terminal devices and MTs of one or more downstream IAB-nodes. The third device 130 also comprises the CU 132 for the DUs of all IAB-nodes and for its own DUs, for example, DU 131. It is assumed that the DU on an IAB-node can setup F1 interface with only one IAB-donor CU-CP. This IAB-donor may change through topology adaptation.

It should be understood that although the DU 121 and the CU 122 is illustrated to be implemented on a single entity, the DU 121 and the CU 122 may be implemented on separated entities, e.g., in case of cloud-based deployments. Similarly, the DU 131 and the CU 132 may be implemented on a single entity or separated entities.

In some example embodiments, the DU 112 in the first device 110 connects to the CU 132 in the third device 130 using a F1 interface (for convenience, also referred to as a first communication interface herein). Both F1 Control plane interface (F1-C) and F1 User plane interface (F1-U) run over RLC channels on the wireless backhaul between the MT 111 in the first device 110 and the DU 131 in the third device 130. It should be appreciated that F1 interface is just an example, any appropriate communication interface may be used between the first device 110 and the third device 130.

In some scenarios, the first device 110 may change its attachment point from the DU 131 in the third device 130 to the DU 121 in the second device 120, thus cause the change of the IAB-donor CU from the CU 132 in the third device 130 to the CU 122 in the second device 120. For convenience, the CU 132 is also referred to as a source CU, and the CU 122 is also referred to as a target CU. When the first device 110 change the IAB-donor from the third device 130 to the second device 120, the DU 112 of the first device 110 needs to setup or establish a F1 interface (for convenience, also referred to as a second communication interface herein) with the target CU 122. It should be appreciated that F1 interface is just an example, any appropriate communication interface may be used between the first device 110 and the second device 120.

According to embodiments of the present disclosure, context information associated with at least one fourth device 140 and the first communication interface between the first device 110 and the third device 130 is retained during setup or establishment of the second communication interface and is reused for the fourth device 140, for example, when the fourth device 140 reestablishes the RRC connection or resumes RRC connection with the first device 110 or other communication, via the second communication interface. In this way, the RRC reestablishment or RRC resume procedure can be simplified, and signaling can be minimized. Further, latencies and service break for the terminal devices at the change of the IAB-donor can be reduced.

Figure 2:
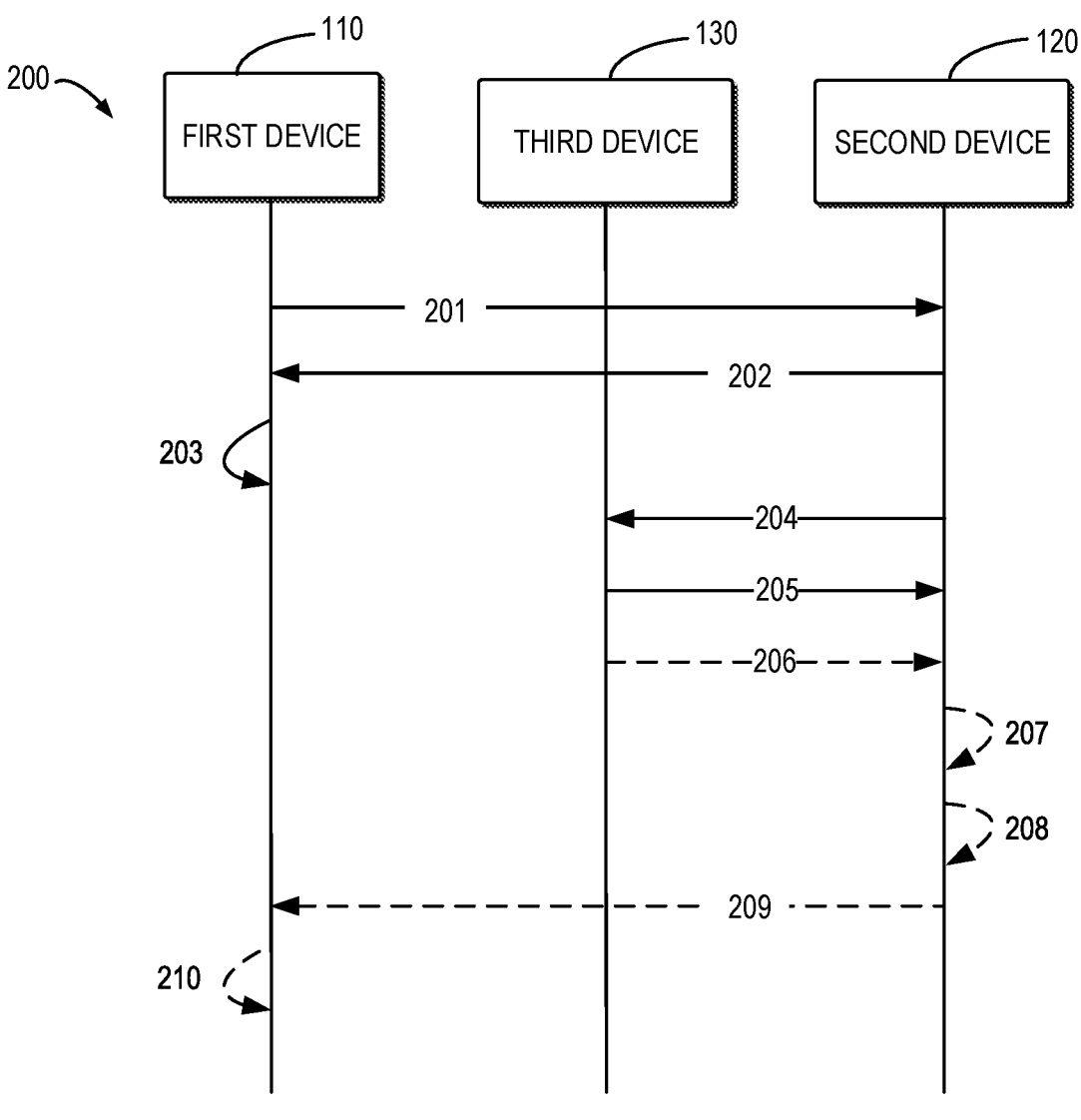
FIG. 2 shows a signaling chart illustrating a process for communication during an inter-donor topology adaptation according to some example embodiments of the present disclosure.

Principle and implementations of the present disclosure will be described in detail below with reference to FIGS. 2 to 7. FIG. 2 shows a signaling chart illustrating a process 200 for communication during inter-donor topology adaptation according to some example embodiments of the present disclosure. The process 200 may involve a source donor (for example, the third device 130), a target donor (for example, the second device 120) and an IAB-node affected by inter-donor topology adaptation. The affected IAB node may be the migrating IAB-node (for example, the first device 110) or the child IAB-node (another first device not shown) of the migrating IAB-node if present. For the purpose of discussion, the process 200 will be described with reference to FIG. 1 by taking the migrating IAB-node as an example of the affect IAB node. In this case, the process 200 may involve the first device 110, the second device 120 and the third device 130 as illustrated in FIG. 1. It would be appreciated that although the process 200 has been described in the communication network 100 of FIG. 1, this process may be likewise applied to other communication scenarios.

As shown in FIG. 2, the first device 110 transmits 201, to the second device 120, information (for convenience, also referred to as first information herein) about the first communication interface between the first device 110 and the third device 130. Any suitable information that can uniquely identify the first communication interface is feasible. In some embodiments, the information may comprise an identity of the third device 130. In some embodiments, the information may comprise an identity of the CU 132 of the third device 130. For example, the identity may be the Global NG-RAN Node Identity (ID) of the CU 132. As another example, the identity may be gNB-CU name of the CU 132. As another example, the identity may be the transport layer address of the CU 132. Of course, any other suitable information that can uniquely identify the third device 130, i.e. source donor, is also feasible.

In some embodiments, the information may also comprise an identity of the first device 110. In some embodiments, the information may comprise an identity of the DU 112 of the first device 110, or an identity of the MT 111 of the first device 111. For example, the identity may be the gNB-DU ID of the DU 112. As another example, the identity may be gNB-DU name of the DU 112. As another example, the identity may be the transport layer address of the DU 112. In another example, the identity may be the Backhaul Adaptation Protocol (BAP) address or identify allocated by the third device 130 to the first device 110. Of course, any other suitable information that can uniquely identify the first device 110, i.e. the migrating IAB-node or the child IAB-node of the migrating IAB-node, is also feasible. In some other embodiments, the information may also comprise the cell identity (or identities) of the first device 110. For example, the cell identity is used by the first device 110 for the first communication interface with the third device 130.

In some alternative embodiments, the information may be transmitted from the third device 130 to the second device 120, during initiating of a handover preparation for the first device 110 from the third device 130 to the second device 120. In some alternative embodiments, the first device 110 may transmit the information during setup or establishment of the second communication interface between the first device 110 and the second device 120. In some example embodiments, the first device 110 may transmit the information in a request for setting up or establishing the second communication interface. In example embodiments where the communication interface is F1 interface, the request for setting up or establishing the communication interface may be a F1 SETUP REQUEST message, or any other suitable F1 message.

Upon receiving the information about the first communication interface, the second device 120 transmits 202, to the first device 110, an indication that context information associated with at least one fourth device 140 and the first communication interface can be retained. The indication may be in any suitable forms. In some embodiments, the context information may refer to context information of all devices served by the first device 110. In some embodiments, the second device 120 may transmit 202, to the first device 110, an indication that context information associated with at least one fourth device 140 and the first communication interface is retained, after the context information is retrieved from the third device 130 as shown by 206.

In some embodiments, the second device 120 may transmit the indication during initiating of a handover from the third device 130 to the second device 120. For example, the second device 120 may include the indication in the HandoverCommand message when the second device 120 send a handover request acknowledgement message to the third device 130 to accept the inbound handover for the first device 110. In some alternative embodiments, the second device 120 may transmit the indication during setup or establishment of the second communication interface between the first device 110 and the second device 120. In some example embodiments, the second device 120 may transmit the indication in a response to the request for setting up or establishing the second communication interface. In example embodiments where the communication interface is F1 interface, the response may be a F1 SETUP RESPONSE message, or any other suitable message.

Upon receiving the indication, the first device 110 retains 203 the context information for use in communication via the second communication interface between first device 110 and the second device 120. In some embodiments, the first device 110 keeps the context information without removing it during setup or establishment of the second communication interface, and reuses the context information for communication via the second communication interface.

With continued reference to FIG. 2, upon receiving the information about the first communication interface, the second device 120 transmits 204, to the third device 130, a request for obtaining the context information of at least one fourth device 140 associated with the first communication interface. In some embodiments, the request may comprise the information about the first communication interface. In some embodiments, the request may comprise an identity of the third device 130. In some embodiments, the request may comprise an identity of the first device 110 and optionally cell identity of one or more cells of the first device 110. In another embodiment, the request may be an Xn application protocol (XnAP) message, for example, an XnAP RETRIEVE UE CONTEXT REQUEST message or any other suitable XnAP message, when an Xn interface is established between the second device 120 and the third device 130.

In some embodiments, the second device 120 may transmit the request for obtaining the context information during initiating of a handover from the third device 130 to the second device 120. In some alternative embodiments, the second device 120 may transmit the request for obtaining the context information during setup or establishment of the second communication interface between the first device 110 and the second device 120. In some alternative embodiments, the second device 120 may transmit the request for obtaining the context information during RRC reestablishment or RRC resume of the at least one fourth device 140.

In some embodiments, the second device 120 may transmit the request for obtaining context information of all the fourth devices 140 with respect to the first communication interface. In this way, a communication latency may be reduced. In some alternative embodiments, the second device 120 may transmit the request including the cell identity for one or more cells of the first device 110, in order to obtain context information of fourth devices 140 served by one or more cells of the first device 110. In some alternative embodiments, the second device 120 may transmit the request for obtaining context information of part of the fourth devices with respect to the first communication interface. For example, the second device 120 may transmit the request for obtaining context information of one fourth device with respect to the first communication interface.

Upon receiving the request for obtaining the context information, the third device 130 transmits 205, the requested context information to the second device 120. In some embodiments, the context information may include the UE context information related to the first communication interface. In example embodiments where the communication interface is F1 interface, the UE context information is related to the F1 interface. In some embodiments, the UE context information may include context information related to a terminal device served by the first device 110. In some embodiments, the UE context information may include context information related to a child IAB-node served by the first device 110. For example, the UE context information may include at least one of the following: the gNB-CU UE F1AP ID assigned by the third device 130, the gNB-DU UE F1AP ID assigned by the first device 110, the information of the radio resource configuration, the information of the signalling radio bearers (SRBs), the information of the data radio bearers (DRBs), the information of the BH RLC channels when the fourth device 140 is an IAB-MT, the information of the F1-U tunnels, etc. Of course, the UE context information may also include any other information established in the first device 110 and the third device 130 during a normal F1AP UE Context Setup procedure. It should be noted that this is merely an example, and the present application does not make limitation for the contents of the context information.

In some embodiments, the third device 130 may transmit context information for at least one fourth device or a list of fourth devices. In some embodiments, the third device 130 may transmit context information for all fourth devices served by one or more specific cells of the first device 110. In some embodiments, the third device 130 may transmit context information for all fourth devices associated with the first communication interface. In another embodiment, the context information may be transmitted via an XnAP message, for example, an XnAP RETRIEVE UE CONTEXT RESPONSE message or any other suitable XnAP message, when an Xn interface is established between the second device 120 and the third device 130.

In some embodiments, the third device 130 may also transmit 206, to the second device 120, information (for convenience, also referred to as second information herein) for validating a RRC connection reestablishment request or RRC resume request from the at least one fourth device 140. In another embodiment, the second information may be transmitted via an XnAP message when an Xn interface is established between the second device 120 and the third device 130. In some embodiments, the third device 130 may transmit the context information and the second information together to the second device 120.

In some embodiments, the second information may include the UE-identity for one fourth device 140. In some embodiments, the UE-identity may include at least one of the Cell Radio Network Temporary Identifier (C-RNTI) assigned to the fourth device 140, the Physical Cell Identity (PCI) of the cell that the fourth device 140 connected to the first device 110, the shortMAC-I, the ShortI-RNTI-Value, the resumeMAC-I, or any other information that may be used to validate the fourth device 140.etc The ShortMAC-I is used to identify and verify the fourth device 140 at RRC connection re-establishment. The ShortMAC-I is the 16 least significant bits of the message authentication code used for data integrity of signalling messages (MAC-I) calculated using the Access Stratum (AS) security configuration of the cell of the first device 110 that is serving the fourth device 140. The ShortI-RNTI-Value is used to identify the suspended UE context of a UE in RRC_INACTIVE using fewer bits compared to I-RNTI-Value. The resumeMAC-I is an authentication token to facilitate UE authentication at gNB, with the 16 least significant bits of the MAC-I calculated using the Access Stratum (AS) security configuration In some embodiments, upon receiving the context information, the second device 120 may update 207 some or all of the context information for adaptation with the second communication interface. In example embodiments where the communication interface is F1 interface, the context information is related to the F1 interface. In some embodiments, the updated context information may include at least one of the following: the updated gNB-CU UE F1AP ID assigned by the second device 120, the gNB-DU UE F1AP ID which is used to identify the fourth device 140 in the first device 110, the information of the updated radio resource configuration, the information of the updated SRBs, the information of the updated DRBs, the information of the updated backhaul RLC channels when the fourth device 140 is an IAB-MT, the information of the updated F1-U tunnels, etc. Of course, the updated UE context information may also include any other information updated in the first device 110 and the third device 130 during a normal F1AP UE Context modification procedure. It should be noted that this is merely an example, and the present application does not make limitation for the contents of the updated context information. In example embodiments where the communication interface is F1 interface, the second device 120 may update 207 the context information via a F1AP UE Context Modification procedure, or any other suitable F1AP procedure.

In some embodiments, when the at least one fourth device 140 initiates a RRC connection reestablishment request or RRC resume request, the second device 120 may validate 208 the RRC connection reestablishment request or RRC resume request with the second information received from the third device 130. In some embodiments, the validation may be performed before the update of the context information. Of course, the present disclosure does not make limitation for the order of the validation and the update.

In some embodiments, during RRC connection reestablishment procedure or RRC resume request of the at least one fourth device 140, the second device 120 may transmit 209 the updated context information to the first device 110. In some embodiments where the second communication interface is a F1 interface, the second device 120 may transmit the updated context information in a F1AP message, for example, in a F1AP UE CONTEXT MODIFICATION REQUEST message, or other F1AP messages.

Upon receiving the updated context information, the first device 110 may update 210 the retained context information with the updated context information. With the updated context information, the first device 110 may continue to perform the RRC reestablishment procedure or RRC resume procedure. In this way, the reestablishment procedure or resume procedure can be simplified by eliminating full reestablishment of context information in the IAB-node when the IAB-donor is changed. This minimizes signaling over Xn interface, F1 interface and wireless backhaul, and reduces the latencies and service break for the terminal devices at the change of the IAB-donor.

Figure 3:
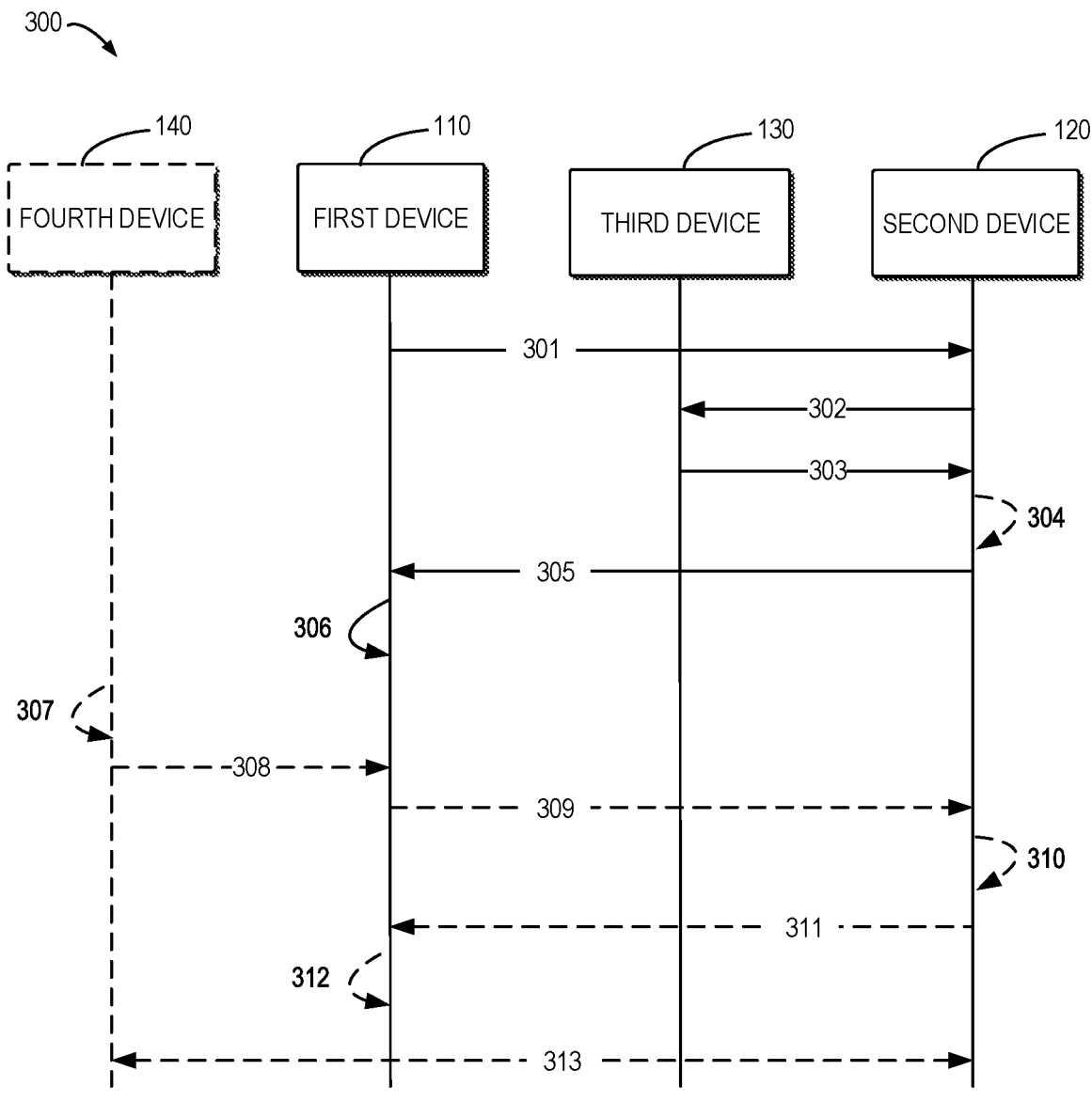
FIG. 3 shows a signaling chart illustrating a process for communication during an inter-donor topology according to some other example embodiments of the present disclosure.
Figure 4:
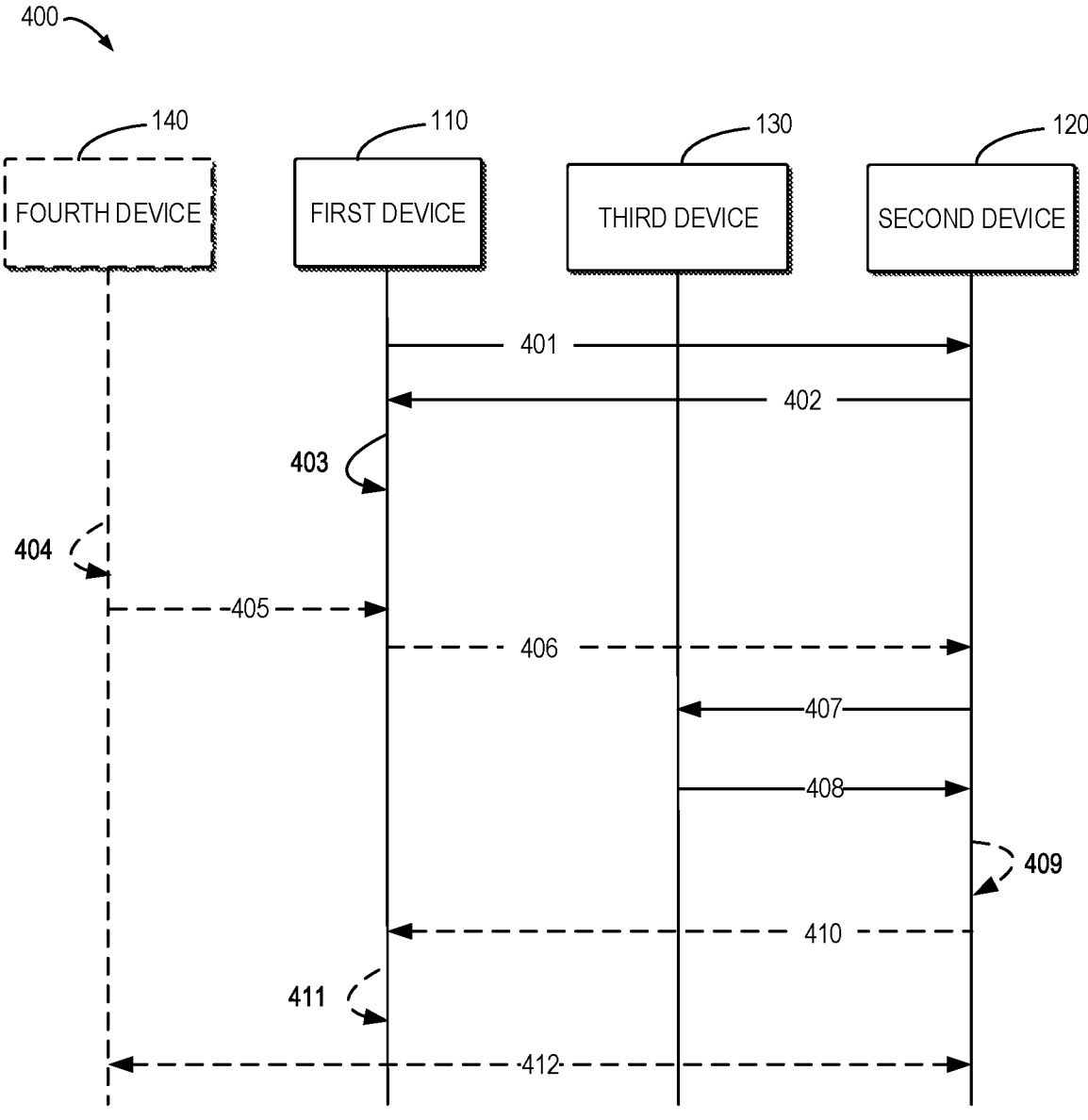
FIG. 4 shows a signaling chart illustrating a process for communication during an inter-donor topology according to still other example embodiments of the present disclosure.

More detailed description will be made with reference to FIGS. 3 and 4. FIG. 3 describes an example context information transfer during establishment of the second communication interface (for example, during F1 setup procedure). FIG. 4 describes an example context information transfer during connection reestablishment of terminal devices (for example, during Xn Retrieve UE Context procedure).

FIG. 3 shows a signaling chart illustrating a process 300 for inter-donor topology adaptation according to some other example embodiments of the present disclosure. For the purpose of discussion, the process 300 will be described with reference to FIG. 1. The process 300 may involve first device 110, the second device 120, the third device 130 and the fourth device 140 as illustrated in FIG. 1. It would be appreciated that although the process 300 has been described in the communication network 100 of FIG. 1, this process may be likewise applied to other communication scenarios. FIG. 3 describes context information transfer during setup or establishment of the second communication interface.

When a handover of the first device 110 from the third device 130 to the second device 120 is initiated, the CU 122 of the second device 120 configures a new adaptation-layer route on the wireless BH between the first device 110 and the DU 121 of the second device 120. Then the first device 110 performs DU setup procedure and setup or establishes a communication interface with the CU 122 of the second device 120. When the DU 112 of the first device 110 needs to setup or establish the communication interface with the CU 122 of the second device 120, the process in FIG. 3 may be carried out.

As shown in FIG. 3, the first device 110 transmits 301, to the second device 120, information (for convenience, also referred to as first information herein) about the first communication interface between the first device 110 and the third device 130. In this example, the first device 110 transmits the information in a request for setting up or establishing the second communication interface between the first device 110 and the second device 120. In example embodiments where the communication interface is F1 interface, the request for establishing the second communication interface may be a F1 SETUP REQUEST message.

Any suitable information that can uniquely identify the first communication interface is feasible. In some embodiments, the information may comprise an identity of the third device 130. In some embodiments, the information may comprise an identity of the CU 132 of the third device 130. For example, the identity may be the Global NG-RAN Node Identity (ID) of the CU 132. As another example, the identity may be gNB-CU name of the CU 132. As another example, the identity may be the transport layer address of the CU 132. Of course, any other suitable information that can uniquely identify the third device 130, i.e. source donor, is also feasible.

In some embodiments, the information may also comprise an identity of the first device 110. In some embodiments, the information may comprise an identity of the DU 112 of the first device 110, or an identity of the MT 111 of the first device 111. For example, the identity may be the gNB-DU ID of the DU 112. As another example, the identity may be gNB-DU name of the DU 112. As another example, the identity may be the transport layer address of the DU 112. In another example, the identity may be the BAP address or identify allocated by the third device 130 to the first device 110. Of course, any other suitable information that can uniquely identify the first device 110, i.e. the migrating IAB-node or the child IAB-node of the migrating IAB-node, is also feasible. In some other embodiments, the information may also comprise the cell identity (or identities) of the first device 110. For example, the cell identity is used by the first device 110 for the first communication interface with the third device 130.

Upon receiving the information about the first communication interface, the second device 120 transmits 302, to the third device 130, a request for obtaining the context information associated with at least one fourth device 140 and the first communication interface. In some embodiments, the request may comprise the information about the first communication interface. In some embodiments, the request may comprise an identity of the third device 130. In some embodiments, the request may comprise an identity of the first device 110. In some embodiments, the request may comprise one or more cell identity of the first device 110.

In this example, the second device 120 may initiate an XnAP procedure to retrieve the context information from the third device 130. In some embodiments, the second device 120 may transmit the request for obtaining context information of all the fourth devices associated with the first communication interface. In this way, a communication latency for reestablishment between the first device 110 and the second device 120 may be reduced. In some alternative embodiments, the second device 120 may transmit the request including the cell identity for one or more cells of the first device 110, in order to obtain context information of the fourth devices in one or more cells provided by the first device 110. In some alternative embodiments, the second device 120 may transmit the request for obtaining context information of part of the fourth devices associated with the first communication interface.

Upon receiving the request for obtaining the context information, the third device 130 transmits 303, the requested context information to the second device 120. In some embodiments, the context information may include the UE context information related to the first communication interface. In example embodiments where the communication interface is F1 interface, the UE context information is related to the F1 interface. In some embodiments, the UE context information may include at least one of the following: the gNB-CU UE F1AP ID assigned by the third device 130, the gNB-DU UE F1AP ID assigned by the first device 110, the information of the radio resource configuration, the information of the SRBs, the information of the DRBs, the information of the BH RLC channels when the fourth device 140 is an IAB-MT, the information of the F1-U tunnels, etc. Of course, the UE context information may also include any other information established in the first device 110 and the third device 130 during a normal F1AP UE Context Setup procedure. It should be noted that this is merely an example, and the present application does not make limitation for the contents of the context information.

In some embodiments, the third device 130 may transmit context information for one fourth device or a list of fourth devices. In some embodiments, the third device 130 may transmit context information for all fourth devices served by one or more specific cells of the first device 110. In some embodiments, the third device 130 may transmit context information for all fourth devices associated with the first communication interface.

In some embodiments, the third device 130 may also transmit, to the second device 120, information (for convenience, also referred to as second information herein) for validating a RRC connection reestablishment request or RRC resume request from the at least one fourth device 140. For example, the CU 132 of the third device 130 may transmit, to the CU 122 of the second device 120, the second information for every connected terminal device. In some embodiments, the third device 130 may transmit the context information and the second information together to the second device 120.

In some embodiments, the second information may include the UE-identity for the fourth device 140. In some embodiments, the UE-identity may include at least one of the C-RNTI assigned to the fourth device 140, the PCI of the cell that the fourth device 140 connected to the first device 110, the shortMAC-I, the ShortI-RNTI-Value, the resume-MAC-I, or any other information that may be used to validate the fourth device 140.

In some embodiments, the second information may comprise a token. At least one of Cell-Radio Network Temporary Identifier (C-RNTI), Physical Cell ID (PCI) and target cell ID may be allocated by the IAB-node (i.e., the first device 110), and the source gNB (i.e., the third device 130) may generate the token and provide it to the target donor (i.e., the second device 120). In this way, the target donor (i.e., the second device 120) can validate the token received in RRC connection reestablishment request or RRC resume request later on behalf of source donor (i.e., the third device 130).

In some embodiments, upon receiving the context information, the second device 120 may save the context information and decide whether fully reuse it. In some embodiments, the second device 120 may update 304 some or all of the context information for adaptation with the second communication interface. For example, the second device 120 may update 304 part of the context information. In example embodiments where the communication interface is F1 interface, the context information is related to the F1 interface. In some embodiments, the updated context information may include at least one of the following: the updated gNB-CU UE F1AP ID assigned by the second device 120, the gNB-DU UE F1AP ID which is used to identify the fourth device 140 in the first device 110, the information of the updated radio resource configuration, the information of the updated SRBs, the information of the updated DRBs, the information of the updated backhaul RLC channels when the fourth device 140 is an IAB-MT, the information of the updated F1-U tunnels, etc. Of course, the updated UE context information may also include any other information updated in the first device 110 and the third device 130 during a normal F1AP UE Context modification procedure. It should be noted that this is merely an example, and the present application does not make limitation for the contents of the updated context information.

In some embodiments, target donor-CU-CP (i.e., CP of the CU 122 of the second device 120) initiates the E1 application protocol (E1AP) Context setup for at least the fourth device 140 in the target donor-CU-UP (i.e., user plane (UP) of the CU 122 of the second device 120). The E1AP message additionally includes the Downlink Fully Qualified TEID (DLF-TEID) information in the first device 110, e.g. migrating IAB node. This is different from normal E1AP UE Context Setup that the DLF-TEID is not known during the E1AP UE Context Setup procedure. Target Donor-CU-CP may also consider the new IP address(es) assigned to the first device 110, e.g. migrating IAB node when setting up the E1AP context in Target-Donor-CU-UP.

With continued reference to FIG. 3, the second device 120 transmits 305, to the first device 110, an indication that context information associated with at least one fourth device 140 and the first communication interface is retained. The indication may be in any suitable forms. In this example, the second device 120 may transmit the indication in a response to the request for setting up or establishing the second communication interface. In example embodiments where the communication interface is F1 interface, the response may be a F1 SETUP RESPONSE message.

Upon receiving the indication, the first device 110 retains 306 the context information for use in communication via the second communication interface between first device 110 and the second device 120. In some embodiments, the first device 110 keeps the context information without removing it during setup or establishment of the second communication interface, and reuses the context information for communication via the second communication interface.

In some embodiments, when the first device 110 disconnects from the third device 130, the first device 110 stops the DU operation (including over the air transmission). After the first device 110 connects to the second device 120, the first device 110 resumes the DU operation (including over the air transmission). During this period, the fourth device 140 may detect the Radio Link Failure (RLF) when the first device 110 stops the DU operation, and reconnect with the first device 110 when the first device 110 resumes the DU operation. Upon declaring RLF to the old DU (in this example, the DU 112 of the first device 110, when it stops the DU operation), the fourth device 140 may select 307 the new DU (in this example, the DU 112 of the first device 110, when it resumes the DU operation), and initiate 308 a RRC connection reestablishment procedure via the first device 110. The first device 110 may transmit 309 the F1 INITIAL UL RRC message to CP of the CU 122 of the second device 120. Since the CU 122 of the second device 120 already retrieved the context information from the CU 132 of the third device 130, the CU 122 of the second device 120 does not need to initiate the XnAP Retrieve UE Context procedure as currently used in reestablishment procedure. In another example, a RRC_INACTIVE fourth device initiates the RRC connection resume procedure with the first device 110. Since the CU 122 of the second device 120 already retrieved the context information from the CU 132 of the third device 130, the CU 122 of the second device 120 does not need to initiate the XnAP Retrieve UE Context procedure as currently used in RRC connection reestablishment procedure or RRC connection resume procedure. Thereby, the RRC connection reestablishment procedure or resume procedure is significantly simplified and the communication latency is reduced.

In some embodiments, with the second information received from the third device 130, the second device 120 may validate 310 the information, for example, the token, received in the RRCReestablishmentRequest message, or RRCResumeRequest message.

In some embodiments where the second device 120 updates the context information, the second device 120 may transmit 311 the updated context information, for example, by a F1AP UE Context Modification procedure. The first device 110 may find 312 the context information of the fourth device 140. For example, the first device 110 may find the context information based on old gNB-DU UE F1AP ID and replace old C-RNTI or PCI with new C-RNTI or PCI. Then, other procedures to complete the reestablishment will be carried out 313 in a traditional way, and omitted here for being concise.

With the process of FIG. 3, the reestablishment procedure or resume procedure can be significantly simplified by eliminating full reestablishment of context information in the first device 110, e.g. migrating IAB-node, when the IAB-donor is changed. This minimizes signaling over Xn interface, F1 interface and wireless backhaul, and reduces the latencies and service break for the terminal devices at the change of the IAB-donor.

FIG. 4 shows a signaling chart illustrating a process 400 for inter-donor topology adaptation according to some other example embodiments of the present disclosure. For the purpose of discussion, the process 400 will be described with reference to FIG. 1. The process 400 may involve the first device 110, the second device 120, the third device 130 and the fourth device 140 as illustrated in FIG. 1. It would be appreciated that although the process 400 has been described in the communication network 100 of FIG. 1, this process may be likewise applied to other communication scenarios.

When a handover of the first device 110 from the third device 130 to the second device 120 is initiated, the CU 122 of the second device 120 configures a new adaptation-layer route on the wireless BH between the first device 110 and the DU 121 of the second device 120. Then the first device 120 performs DU setup procedure and establishes a communication interface with the CU 122 of the second device 120. When the DU 112 of the first device 110 needs to establish the communication interface with the CU 122 of the second device 120, the process in FIG. 4 may be carried out.

As shown in FIG. 4, the first device 110 transmits 401, to the second device 120, information (for convenience, also referred to as first information herein) about the first communication interface between the first device 110 and the third device 130. In this example, the first device 110 transmits the information in a request for setting up or establishing the second communication interface between the first device 110 and the second device 120. In example embodiments where the communication interface is F1 interface, the request for establishing the second communication interface may be a F1 SETUP REQUEST message.

Any suitable information that can uniquely identify the first communication interface is feasible. In some embodiments, the information may comprise an identity of the third device 130. In some embodiments, the information may comprise an identity of the CU 132 of the third device 130. For example, the identity may be the Global NG-RAN Node ID of the CU 132. As another example, the identity may be gNB-CU name of the CU 132. As another example, the identity may be the transport layer address of the CU 132. Of course, any other suitable information that can uniquely identify the third device 130, i.e. source donor, is also feasible.

In some embodiments, the information may also comprise an identity of the first device 110. In some embodiments, the information may comprise an identity of the DU 112 of the first device 110, or an identity of the MT 111 of the first device 111. For example, the identity may be the gNB-DU ID of the DU 112. As another example, the identity may be gNB-DU name of the DU 112. As another example, the identity may be the transport layer address of the DU 112. In another example, the identity may be the BAP address or identify allocated by the third device 130 to the first device 110. Of course, any other suitable information that can uniquely identify the first device 110, i.e. the migrating IAB-node or the child IAB-node of the migrating IAB-node, is also feasible. In some other embodiments, the information may also comprise the cell identity (or identities) of the first device 110. For example, the cell identity is used by the first device 110 for the first communication interface with the third device 130.

Upon receiving the information about the first communication interface, the second device 120 transmits 402, to the first device 110, an indication that context information associated with at least one fourth device 140 and the first communication interface is retained. The indication may be in any suitable forms. In this example, the second device 120 may transmit the indication in a response to the request for setting up or establishing the second communication interface. In example embodiments where the communication interface is F1 interface, the response may be a F1 SETUP RESPONSE message.

Upon receiving the indication, the first device 110 retains 403 the context information for use in communication via the second communication interface between first device 110 and the second device 120. In some embodiments, the first device 110 keeps the context information without removing it during establishment of the second communication interface, and reuses the context information for communication via the second communication interface.

In some embodiments, when the first device 110 disconnects from the third device 130, the first device 110 stops the DU operation (including over the air transmission). After the first device 110 connects to the second device 120, the first device 110 resumes the DU operation (including over the air transmission). During this period, the fourth device 140 may detect the RLF when the first device 110 stops the DU operation, and reconnect with the first device 110 when the first device 110 resumes the DU operation. Upon declaring RLF to the old DU (in this example, the DU 112 of the first device 110, when it stops the DU operation), the fourth device 140 may select 404 the new DU (in this example, the DU 112 of the first device 110, when it resumes the DU operation), and initiate 405 a connection reestablishment procedure via the first device 110. The first device 110 may transmit 406 the F1 INITIAL UL RRC message to CP of the CU 122 of the second device 120. Then the second device 120 initiates an Xn Retrieve UE Context procedure.

During the Xn Retrieve UE Context procedure, the second device 120 transmits 407, to the third device 130, a request for obtaining context information of the fourth device 140 with respect to the first communication interface. In some embodiments where the communication interface is F1 interface, the request may be a Xn RETRIEVE UE CONTEXT REQUEST message. In some embodiments, the request may comprise the information about the first communication interface. In some embodiments, the request may comprise an identity of the third device 130. In some embodiments, the request may comprise an identity of the first device 110. In some embodiments, the request may comprise an identity of the fourth device 140. Of course, the request may comprise any other suitable information. In some embodiments where the request may comprise information for validating the connection reestablishment request or resume request from the fourth device 140, the third device 130 may validate the connection reestablishment request or resume request from the fourth device 140 based on the information.

As a response to the request, the third device 130 transmits 408, to the second device 120, the context information associated with the fourth device 140 and the first communication interface. In some embodiments, the context information may include the UE context information related to the first communication interface. In example embodiments where the communication interface is F1 interface, the UE context information is related to the F1 interface. In some embodiments, the UE context information may include context information related to a terminal device served by the first device 110. In some embodiments, the UE context information may include context information related to a child IAB-node served by the first device 110. For example, the UE context information may include at least one of the following: the gNB-CU UE F1AP ID assigned by the third device 130, the gNB-DU UE F1AP ID assigned by the first device 110, the information of the radio resource configuration, the information of the SRBs, the information of the DRBs, the information of the BH RLC channels when the fourth device 140 is an IAB-MT, the information of the F1-U tunnels, etc. Of course, the UE context information may also include any other information established in the first device 110 and the third device 130 during a normal F1AP UE Context Setup procedure. It should be noted that this is merely an example, and the present application does not make limitation for the contents of the context information.

Upon receiving the context information, the second device 120 may save the context information and decide whether fully reuse it. In some embodiments, the second device 120 may update 409 the context information for adaptation with the second communication interface. For example, the second device 120 may update part of the context information. In example embodiments where the communication interface is F1 interface, the updated context information is related to the F1 interface. In some embodiments, the updated context information may include at least one of the following: the updated gNB-CU UE F1AP ID assigned by the second device 120, the gNB-DU UE F1AP ID which is used to identify the fourth device 140 in the first device 110, the information of the updated radio resource configuration, the information of the updated SRBs, the information of the updated DRBs, the information of the updated backhaul RLC channels when the fourth device 140 is an IAB-MT, the information of the updated F1-U tunnels, etc. Of course, the updated UE context information may also include any other information updated in the first device 110 and the third device 130 during a normal F1AP UE Context modification procedure. It should be noted that this is merely an example, and the present application does not make limitation for the contents of the updated context information.

In some embodiments, target donor-CU-CP (i.e., CP of the CU 122 of the second device 120) may initiate the E1 application protocol (E1AP) Context setup for at least the fourth device 140 in the target donor-CU-UP (i.e., user plane (UP) of the CU 122 of the second device 120). The E1AP message additionally includes the DL F-TEID information in the first device 110, e.g. migrating IAB node. This is different from normal E1AP UE Context Setup procedure that the DL F-TEID is not known during the E1AP UE Context Setup procedure. Target Donor-CU-CP may also consider the new IP address(es) assigned to the first device 110, e.g. migrating IAB node, when setting up the E1AP context in Target-Donor-CU-UP.

In some embodiments where the second device 120 updates the context information, the second device 120 may transmit 410 the updated context information, for example, by a F1AP UE Context Modification procedure. The first device 110 may find 411 the retained context information of the fourth device 140. For example, the first device 110 may find the retained context information based on old gNB-DU UE FIAP ID and replace old C-RNTI or PCI with new C-RNTI or PCI. Then, other procedures to complete the reestablishment will be carried out 412 in a traditional way, and omitted here for concise.

With the process of FIG. 4, the RRC connection reestablishment procedure or resume procedure can be simplified by eliminating full reestablishment of context information in the first device 110, e.g. migrating IAB-node, when the IAB-donor is changed while slightly modifying the current specification. This also reduces signaling over Xn interface, F1 interface and wireless backhaul, and improves the latencies and service break for the terminal devices at the change of the IAB-donor.

FIG. 5 shows a flowchart of an example method 500 implemented at a first device in accordance with some example embodiments of the present disclosure. The method 500 may be implemented at a device as a migrating IAB-node or the child IAB-node of the migrating IAB-node, for example, the first device 110 in FIG. 1. For convenience, the method 500 will be described with reference to FIG. 1.

At block 510, the first device 110 transmits, to the second device 120, first information about a first communication interface between the first device 110 and the third device 130. In some embodiments, the first information may comprise at least one of an identity of the third device 130, an identity of the first device 110, and a cell identity of the first device 110 used for the first communication interface. In some embodiments, the transmitting may comprise transmitting the first information to the second device 120 in a setup request for the second communication interface.

At block 520, the first device 110 receives, from the second device 120, an indication that context information associated with at least one fourth device 140 and the first communication interface is retained. In some embodiments, the receiving may comprise receiving the indication from the second device 120 in a response to the setup request.

At block 530, the first device 110 uses the context information in communication via a second communication interface between the first device 110 and the second device 120.

In some embodiments, the first device 110 may further receive updated context information from the second device 120. In some embodiments, the first device 110 may further update the retained context information with the updated context information.

FIG. 6 shows a flowchart of an example method 600 implemented at a second device in accordance with some example embodiments of the present disclosure. The method 600 may be implemented at a device as a target IAB-donor, for example, the second device 120 in FIG. 1. For convenience, the method 600 will be described with reference to FIG. 1.

At block 610, the second device 120 receives, from first device 110, first information about a first communication interface between the first device 110 and the third device 130. In some embodiments, the first information may comprise at least one of an identity of the third device 130, an identity of the first device 110, and a cell identity of the first device 110 used for the first communication interface. In some embodiments, the receiving may comprise receiving the first information from the first device 110 in a setup request for the second communication interface.

At block 620, the second device 120 transmits, based on the first information and to the third device 130, a request for obtaining context information associated with at least one fourth device 140 and the first communication interface. In some embodiments, the request may comprise at least one of an identity of the third device 130, an identity of the first device 110, an identity of the cell of the first device 110, and an identity of the fourth device 140.

In some embodiments, the second device 120 may further transmit, to the first device 110, an indication indicating that the context information associated with the at least one fourth device 140 and the first communication interface is retained. In some embodiments, the transmitting may comprise transmitting, to the first device 110, the indication in a response to the setup request. In some other embodiments, the transmitting may be performed after the second device 120 receives the context information from the third device 130.

At block 630, the second device 120 receives, from third device 130, the context information of the at least one fourth device 140 for use in communication via a second communication interface between the first device 110 and the second device 120. In some embodiments, the second device 120 may update the context information and transmit the updated context information to the first device 110.

In some embodiments, the second device 120 may further receive, from the third device 130, second information for validating a RRC connection reestablishment request or resume request from the at least one fourth device 140, and validate, based on the second information, the RRC connection reestablishment request or resume request from the at least one fourth device 140.

FIG. 7 shows a flowchart of an example method 700 implemented at a third device in accordance with some example embodiments of the present disclosure. The method 700 may be implemented at a device as a source IAB-donor, for example, the third device 130 in FIG. 1. For convenience, the method 700 will be described with reference to FIG. 1.

At block 710, the third device 130 receives, from the second device 120, a request for obtaining context information associated with at least one fourth device 140 and a first communication interface between the first device 110 and the third device 130. In some embodiments, the request may comprise at least one of an identity of the third device 130, an identity of the first device 110, an identity of the cell of the first device 110, and an identity of the fourth device 140.

At block 720, the third device 130 transmits, to the second device 120, the context information for use in communication via a second communication interface between the first device 110 and the second device 120. In some embodiments, the third device 130 may transmit, to the second device 120, second information for validating a connection reestablishment request or resume request from the at least one fourth device 140.

It shall be appreciated that descriptions of features with reference to FIGS. 1 to 4 also apply to the methods 500, 600 and 700, and have the same effects. Thus, the details of the features are omitted.

In some example embodiments, an apparatus capable of performing any of the method 500 (for example, the first device 110) may comprise means for performing the respective steps of the method 500. The means may be implemented in any suitable form. For example, the means may be implemented in a circuitry or software module.

In some example embodiments, the apparatus comprises means for transmitting, at a first device and to a second device, first information about a first communication interface between the first device and a third device; means for receiving, from the second device, an indication indicating that context information associated with at least one fourth device and the first communication interface is retained; and means for using the context information in communication via a second communication interface between the first device and the second device.

In some example embodiments, means for transmitting the first information may comprise means for transmitting the first information to the second device in a setup request for the second communication interface, and means for receiving the indication may comprise means for receiving the indication in a response to the setup request from the second device.

In some example embodiments, the first information may comprise at least one of an identity of the third device and an identity of the first device.

In some example embodiments, the apparatus may further comprise means for receiving, from the second device, updated context information. In some example embodiments, the apparatus may further comprise means for updating the context information with the updated context information.

In some example embodiments, an apparatus capable of performing any of the method 600 (for example, the second device 120) may comprise means for performing the respective steps of the method 600. The means may be implemented in any suitable form. For example, the means may be implemented in a circuitry or software module.

In some example embodiments, the apparatus comprises means for receiving, at a second device, first information about a first communication interface between the first device and a third device; means for transmitting, based on the first information and to the third device, a request for obtaining context information associated with at least one fourth device and the first communication interface; and means for receiving, from the third device, the context information for use in communication via a second communication interface between the first device and the second device.

In some example embodiments, the apparatus may further comprise means for transmitting, to the first device, an indication indicating that the context information associated with the at least one fourth device and the first communication interface is retained.

In some example embodiments, means for receiving the first information may comprise means for receiving the first information from the first device in a setup request for the second communication interface, and means for transmitting the indication in a response to the setup request.

In some example embodiments, means for receiving the first information may comprise means for receiving the first information from the third device in a request for handing over the first device from the third device to the second device, and means for transmitting the indication in a response to the setup request.

In some example embodiments, the apparatus may further comprise: means for receiving, from the third device, second information for validating a connection reestablishment request from the at least one fourth device; and means for validating, based on the second information, the connection reestablishment request from the at least one fourth device.

In some example embodiments, the apparatus may further comprise means for updating the context information. In some example embodiments, the apparatus may further comprise means for transmitting, to the first device, the updated context information. In some example embodiments, the first information may comprise at least one of an identity of the third device and an identity of the first device.

In some example embodiments, an apparatus capable of performing any of the method 700 (for example, the third device 130) may comprise means for performing the respective steps of the method 700. The means may be implemented in any suitable form. For example, the means may be implemented in a circuitry or software module.

In some example embodiments, the apparatus comprises: means for receiving, from a second device, a request for obtaining context information associated with at least one fourth device and a first communication interface between a first device and the third device; and means for transmitting, to the second device, the context information for use in communication via a second communication interface between the first device and the second device.

In some example embodiments, the apparatus may further comprise: means for transmitting, to the second device, second information for validating a connection reestablishment request from the at least one fourth device.

In some example embodiments, the request may comprise at least one of an identity of the third device and an identity of the first device.

In some example embodiments, the first device may be an IAB-node device, each of the second and third devices may be an IAB -donor device, and the fourth device may be at least one of a terminal device and an IAB-node device served by the first device.

FIG. 8 is a simplified block diagram of a device 800 that is suitable for implementing embodiments of the present disclosure. The device 800 may be provided to implement the communication device, for example the first device 110, the second device 120, or the third device 130 as shown in FIG. 1. As shown, the device 800 includes one or more processors 810, one or more memories 820 coupled to the processor 810, and one or more communication modules 840 coupled to the processor 810.

The communication module 840 is for bidirectional communications. The communication module 840 has at least one antenna to facilitate communication. The communication interface may represent any interface that is necessary for communication with other network elements.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the ROM 824. The processor 810 may perform any suitable actions and processing by loading the program 830 into the RAM 822.

The embodiments of the present disclosure may be implemented by means of the program 830 so that the device 800 may perform any process of the disclosure as discussed with reference to FIGS. 2 to 7. The embodiments of the present disclosure may also be implemented by hardware or by a combination of software and hardware.

Figure 9:
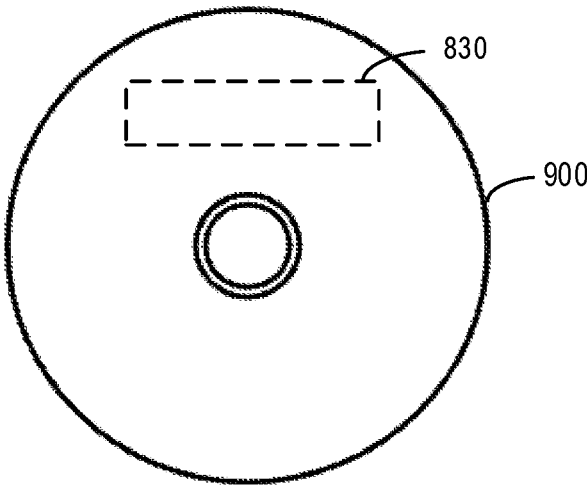
FIG. 9 illustrates a block diagram of an example computer readable medium in accordance with some example embodiments of the present disclosure.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 9 shows an example of the computer readable medium 900 in form of CD or DVD. The computer readable medium has the program 830 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500, 600 and 700 as described above with reference to FIGS. 5, 6 and 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A second device, comprising:
at least one processor; and
at least one memory including computer program code;
the at least one memory and the computer program code configured to, with the at least one processor, cause the second device to:
during setup of a second communication interface that is an F1 interface between a Distributed Unit (DU) of a first device and a Centralized Unit Control Plane (CU-CP) of the second device, receive, at the second device and within an F1 SETUP REQUEST forwarded from the first device, first information about a first communication interface between a first device and a third device, the first information including:
  (i) a Global Next Generation Radio Access Network (NG-RAN) Node ID or gNB-CU name of a CU of the third device;
  (ii) a gNB-DU ID or gNB-DU name of a DU of the first device; and
  (iii) an identity of a cell used by the first device on the first communication interface, and optionally a Backhaul Adaptation Protocol (BAP) address allocated by the third device to the first device;
based on the first information, transmit, to the third device, an Xn application protocol RETRIEVE USER EQUIPMENT (UE) CONTEXT REQUEST that identifies the third device and the first device using identifiers received in the first information and requests the UE context information associated with at least one fourth device served by the first device on the identified cell of the first communication interface;
receive, from the third device, the UE context information for use in communication via a second communication interface between the first device and the second device, the context information comprising:
  (i) a first gNB-CU UE F1 Application Protocol Identification (AP ID) assigned by the third device:
  (ii) a second gNB-DU UE F1AP ID assigned by the first device;
  (iii) radio resource configuration information including signal radio bearers (SRB) and data radio bearers (DRB) information:
  (iv) F1 user plane interface (F1-U) tunnel information; and
  (v) based on the fourth device being an integrated access and backhaul node mobile termination (IAB-MT), backhaul radio link control (RLC) channel information
receive, with the UE context information, second information for validation comprising: Cell Radio Network Temporary Identifier (C-RNTI) assigned to the fourth device, Physical Cell Identity (PCI) of a cell that the fourth device is connected to the first device, a token, and a target cell identifier;
validate, at the second device, an RRCReestablishmentRequest or RRCResumeRequest received via the first device using the second information;
based on validating the RRCReestablishmentRequest or the RRCResumeRequest, update the UE context information for operation over the second communication interface by:
  (i) allocating, at the second device, a new gNB-CU UE F1AP ID;

(ii) modifying a configuration of the SRB and the DRB, and the F1-U tunnel information to reflect attachment to the second device;

(iii) modifying backhaul RLC channel information for a wireless backhaul between the first device and the second device; and (iv) during E1AP UE Context Setup toward a centralized unit-user plane (CU-UP) of the second device, including a downlink fully qualified tunnel endpoint identifier (TEID) known at setup time and accounting for an internet protocol (IP) address newly assigned to the first device;

transmit, from the second device to the first device, an F1 SETUP RESPONSE that indicates that the UE context associated with the first communication interface is retained for reuse on the second communication interface; and transmit, from the second device to the first device, a F1AP UE CONTEXT MODIFICATION REQUEST that conveys the updated UE context information including a mapping from a previously assigned gNB-DU UE F1AP ID and C-RNTI and PCI to identifiers updated in the updated UE context information for operation under the second device.

2. The second device of claim 1, wherein the second device is further caused to: transmit, to the first device, an indication indicating that the context information associated with the at least one fourth device and the first communication interface is retained.

3. The second device of claim 1, wherein the first device is an IAB-node device, each of the second and third devices is an IAB-donor device, and the fourth device is served by the first device.

* * * * *